April 13, 1954     H. E. BALSIGER     2,675,240
CHUCK
Filed March 15, 1950     2 Sheets-Sheet 1
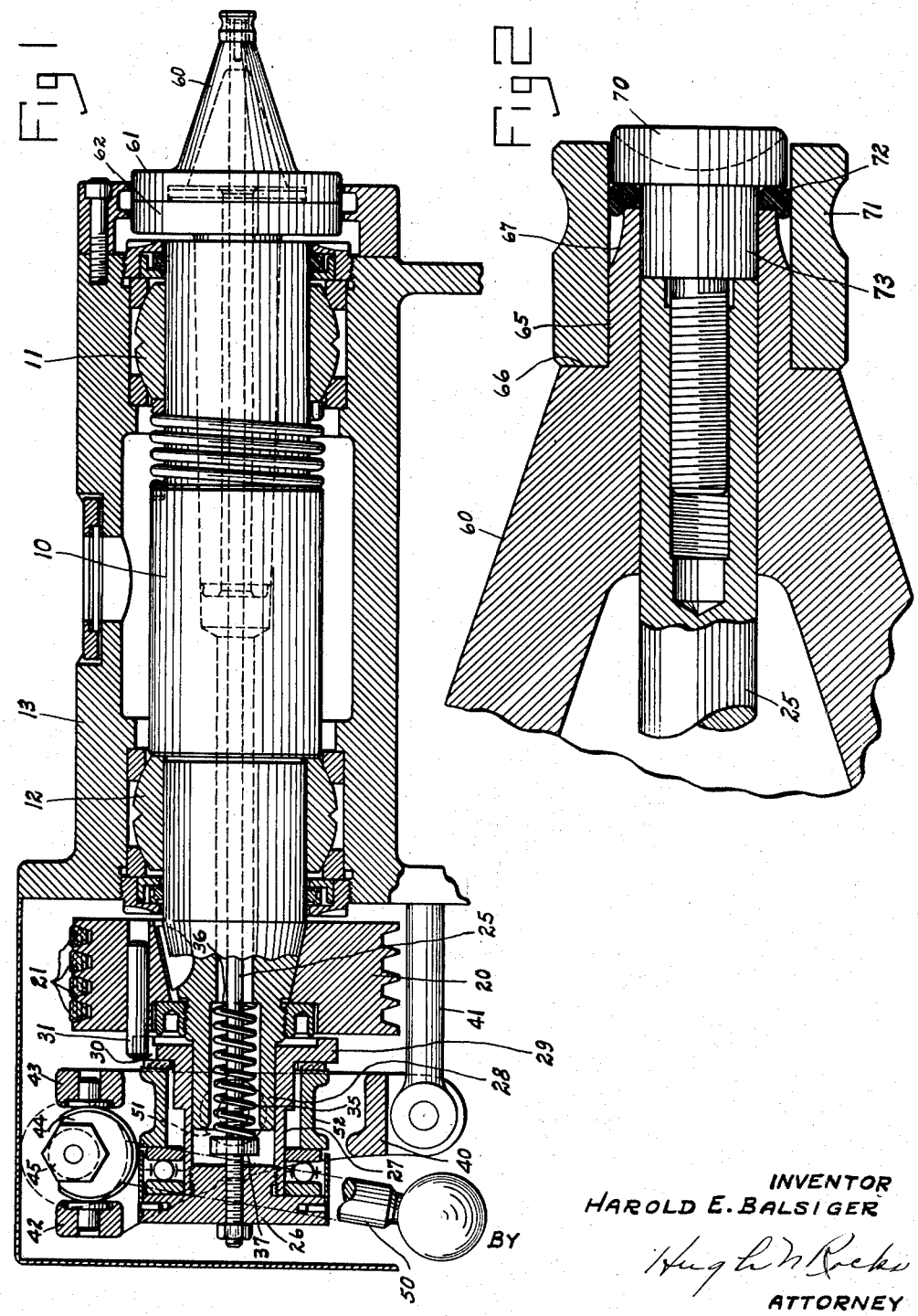
INVENTOR
HAROLD E. BALSIGER
BY
ATTORNEY April 13, 1954          H. E. BALSIGER          2,675,240
CHUCK
Filed March 15, 1950          2 Sheets-Sheet 2
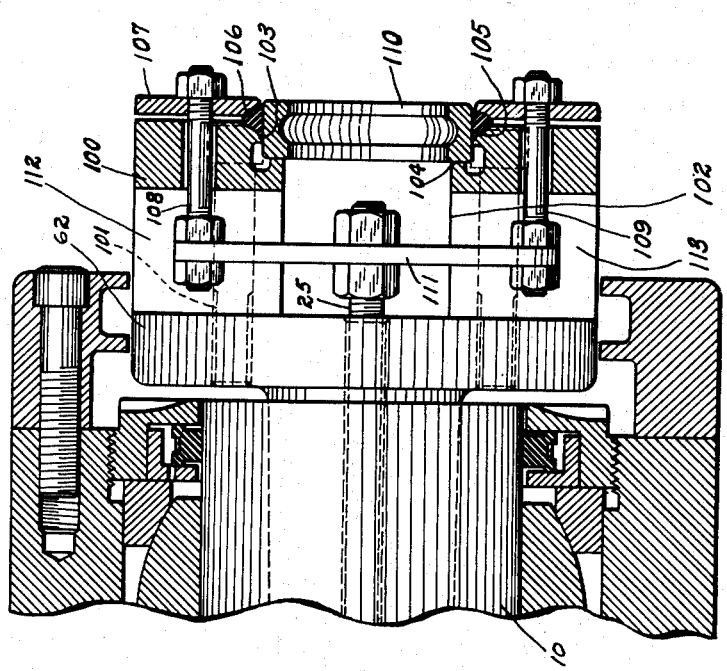
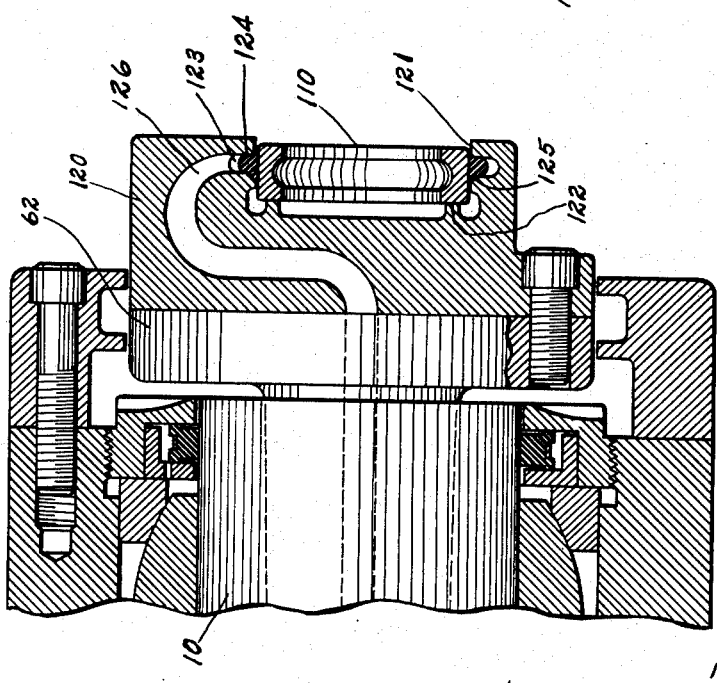
INVENTOR
HAROLD E. BALSIGER
BY
ATTORNEY Patented Apr. 13, 1954

2,675,240

UNITED STATES PATENT OFFICE 2,675,240

CHUCK

Harold E. Balsiger, Waynesboro, Pa., assignor to Landis Tool Company, Waynesboro, Pa.

Application March 15, 1950, Serial No. 149,857

2 Claims. (Cl. 279—2)

This invention relates to chucks, particularly chucks of the type for engaging internal and external surfaces of work pieces.

Most chucks used for this purpose consist of angularly spaced gripping members which often distort or deform the work piece to such an extent that it is difficult or impossible to machine or grind the external surface thereof.

It is, therefore, an object of this invention to provide a chuck having a gripping device which engages the work piece in a continuous contact over the entire periphery thereof.

A further object is to provide a chuck which will not only grip the work piece without distortion, but will also serve to shift the work piece axially against a locating surface.

In the drawings,

Figure 1 is a plan view of a headstock spindle mounting.

Figure 2 is an enlarged view of the chuck.

Figure 3 shows my invention adapted for gripping the external surface of a work piece.

Figure 4 discloses an alternate arrangement for gripping an external surface.

The spindle 10 is rotatably mounted in bearings 11 and 12 and housing 13. Said spindle is rotated through a pulley 20 driven from any suitable source through belts 21. A draw rod 25 passes axially through said spindle, being supported at one end in a block 26. A sleeve 27 threaded to a reduced portion in said block is slidably mounted on an end portion 28 of spindle 10. Said sleeve has a flange portion 29, in which has been cut a notch 30. A pin 31 in pulley 20 has a protruding portion which engages said notch so that said sleeve block and draw rod are rotated along with the spindle.

Said draw rod 25 is held in left-hand or closed position by means of a spring 35 which bears at one end against a shoulder 36 inside said spindle and at the other end against a collar 37 adjustably mounted on said rod 25. The means for shifting said rod against said spring consists of an arm 40 pivotally mounted at the lower end on one end of a rod 41. At the other end of said arm is a yoke portion, the two arms 42 and 43 of which engage or contact with an eccentric 44 on shaft 45, which is suitably mounted in housing 13. Said shaft may be oscillated by means of a lever 50. When so oscillated, a roller 51 mounted at an intermediate point on arm 40 engages a grooved ring 52, which in turn engages the flange portion 29 of sleeve 27.

The chuck consists of a conical arbor 60 having a flange portion 61 which is attached to a similar flange 62 on the end of spindle 10. The smaller end of said cone-shaped member has been machined to form a cylindrical portion 65 and a shoulder 66. The outer end of said cylindrical portion is chamfered at 67 in any suitable manner, not necessarily that shown in the drawing.

Draw rod 25 is slidably supported in the small end of said arbor 60. A headed member 70 is removably mounted in the end of draw rod 25. The diameter of said headed member 70 is slightly less than that of work piece 71. A resilient ringlike member 72 is mounted on the smaller diameter 73 of said headed member between the head thereof and the end of cylindrical portion 65.

When draw rod 25 is shifted to the right by lever 50 against the action of spring 35, the ring 72 barely touches the inside surface of work piece 71. However, when lever 50 is released, spring 35, acting against collar 37, shifts draw rod 25 and headed member 70 to the left.

A resilient ring 72 is compressed between the headed portion 70 and the cylindrical portion 65. When so compressed, it flows in the direction of least resistance, first, radially against the inside surface of the work piece 71 and then axially into the space between the surface of the chamfered portion and the inside surface of the work piece. This axial movement serves to move the work piece slightly in the same direction, locating it against the shoulder 66.

Figure 3 shows a chuck for gripping the external surface of a work piece. A chuck body 100 is attached to flange 62 on spindle 10 by means of screws 101. Said chuck body is cylindrical in shape and has a bore 102 into which the draw rod 25 extends. The outer end of said chuck body has a counterbore 103 of a diameter to accommodate the work piece 110. The shoulder 104 formed by said counterbore serves as a means for axially locating said work piece. At the outer edges of said counterbore is a chamfered surface 105.

A resilient ringlike member 106 of substantially the same diameter as the outside diameter of the work piece is held against said chuck body by means of a ring 107. Said ring in turn is held in place and actuated by studs 108 extending through holes 109 in said chuck body 100. The inner end of said studs 108 is attached to a member 111, which in turn is attached to draw rod 25. Said chuck body 100 has radial slots 112 and 113 for accommodating said member 111.

When pressure is exerted on resilient member 106 by movement of ring 107 toward the chuck body, said resilient member deforms both radially to grip the work piece and axially into the space between said chamfered surface and the surface of said work piece to urge said work piece against the locating shoulder 104.

An alternate form of my invention for gripping external surfaces is shown in Figure 4. The chuck body 120 attached to flange 62 has a bore 121 for receiving work pieces 110. The bottom of said bore is relieved to provide a locating shoulder 122.

An annular groove 123 in said bore provides a close fit for resilient member 124. The inner edge of said groove has a chamfered surface 125.

Air or other fluid under pressure from any suitable source is directed through a passage 126 in chuck body 120 to groove 123. When pressure is applied on member 124, said member is deformed radially to grip the work piece, and axially into the space between said chamfered surface and said work piece to urge said work piece into engagement with shoulder 122.

I claim:

1. In a headstock having a rotatable spindle, a chuck comprising a member mounted on said spindle and having means for locating a work piece axially thereon, means for gripping a work piece including a chamfered cylindrical member, a solid ring-like member of material having a high degree of elasticity and subject to substantial change in cross section in response to the application of pressure, said ring-like member being mounted adjacent the chamfered portion of said cylindrical member, said chamfered portion providing an annular recess between said cylindrical member and said work piece, means for applying pressure on said ring-like member against the chamfered end of said cylindrical member, said pressure means and said recess providing a confined space to which said ring-like member conforms in cross section in response to said pressure means, said change in cross section acting radially to grip a work piece and axially to urge said work piece against said locating means.

2. In a headstock having a rotatable spindle, a chuck comprising a member mounted on said spindle and having means for gripping a work piece including a cylindrical arbor portion having a shoulder at the inner end thereof for receiving a ring-like or tubular work piece, a draw-rod extending through said spindle and arbor having a headed portion thereon, a chamfered portion on said arbor adjacent the headed portion of said draw-rod and forming a confined space between said headed portion and said work piece, a resilient ring-like member on said draw-rod between said arbor and said headed portion, said resilient member being formed of a material having a high degree of elasticity and being capable of substantial change in cross section under pressure, means for shifting said draw-rod axially, said resilient member being responsive to pressure exerted by said headed member to flow radially into engagement with the surface of the said work piece and axially into the remainder of said confined space, whereby to urge said work piece against said shoulder.

References Cited in the file of this patent

UNITED STATES PATENTS

| Number | Name | Date |
|---|---|---|
| 163,217 | Lawson | May 11, 1875 |
| 574,763 | Rudolph | Jan. 5, 1897 |
| 835,320 | Pomeroy | Nov. 6, 1906 |
| 2,390,168 | Piot | Dec. 4, 1945 |
| 2,425,928 | Emerson | Aug. 19, 1947 |
| 2,446,281 | Harding | Aug. 3, 1948 |
| 2,469,873 | Ernest | May 10, 1949 |
| 2,513,412 | Holsing | July 4, 1950 |
| 2,573,928 | Peter | Nov. 6, 1951 |

FOREIGN PATENTS

| Number | Country | Date |
|---|---|---|
| 122,355 | Great Britain | Jan. 23, 1919 |